United States Patent [19]
Gail

[11] 3,722,915
[45] Mar. 27, 1973

[54] HITCH FOR COUPLING AGRICULTURAL IMPLEMENTS TO A TOWING VEHICLE

[76] Inventor: Josef Gail, No. 1, 8891 Unterwittelsbach, Germany

[22] Filed: Oct. 18, 1971

[21] Appl. No.: 190,119

[30] Foreign Application Priority Data

Oct. 26, 1970 Germany.....................P 20 52 389.1
July 6, 1971 Germany.....................P 21 33 516.0

[52] U.S. Cl........280/415 A, 280/461 A, 280/479 R, 172/272
[51] Int. Cl..............................................B60d 1/04
[58] Field of Search............................280/461 A, 280/460 A, 479 R, 479 A, 280/415 A; 172/272, 274

[56] References Cited

UNITED STATES PATENTS

| | | | |
|---|---|---|---|
| 3,022,092 | 2/1962 | Bunting et al. | 280/479 A |
| 3,285,625 | 11/1969 | Krueger | 280/479 R |
| 3,356,388 | 12/1967 | Prillinger et al. | 280/479 R |
| 3,612,574 | 10/1971 | Klopfer | 172/272 X |

FOREIGN PATENTS OR APPLICATIONS

| | | | |
|---|---|---|---|
| 875,176 | 6/1942 | France | 172/274 |
| 408,664 | 9/1966 | Switzerland | 280/479 A |
| 735,563 | 8/1955 | Great Britain | 172/272 |

*Primary Examiner*—Leo Friaglia
*Attorney*—Kurt Kelman et al.

[57] ABSTRACT

An agricultural implement is coupled to a tractor by one upper and two lower releasable links, each lower link having a male coupling member at the end of a linking bar attached to the tractor and an eye on the implement adapted conformingly to receive the coupling member which has the general shape of an upwardly tapering frustum of a pyramid and is provided with a latch biased toward a position in which it holds the coupling member and eye in the conformingly engaged position. The upper link is an inverted version of one of the lower links.

12 Claims, 16 Drawing Figures

Patented March 27, 1973
3,722,915
5 Sheets-Sheet 1
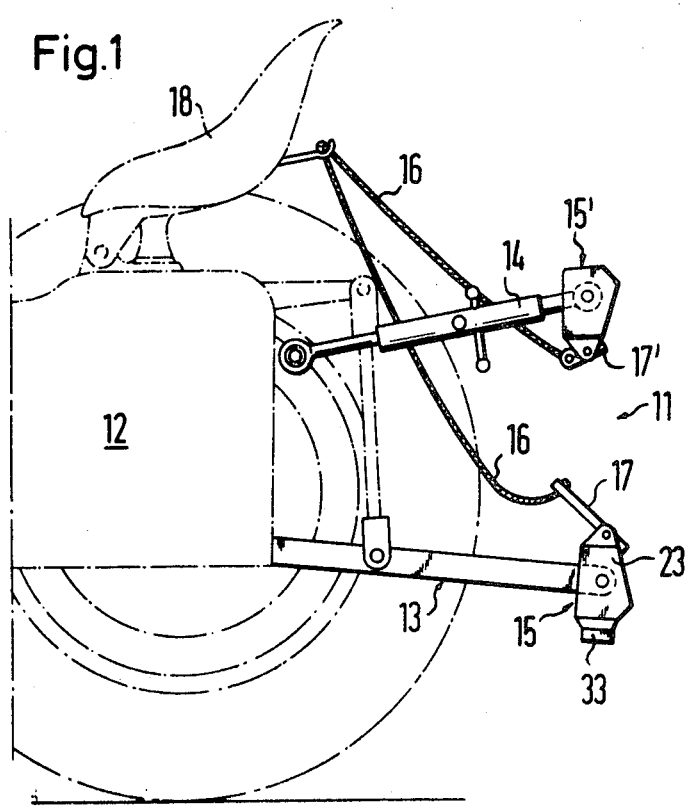
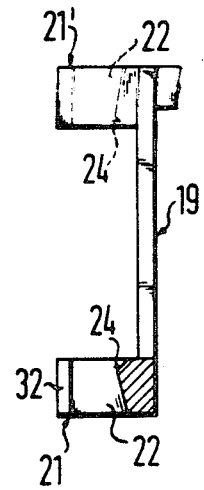
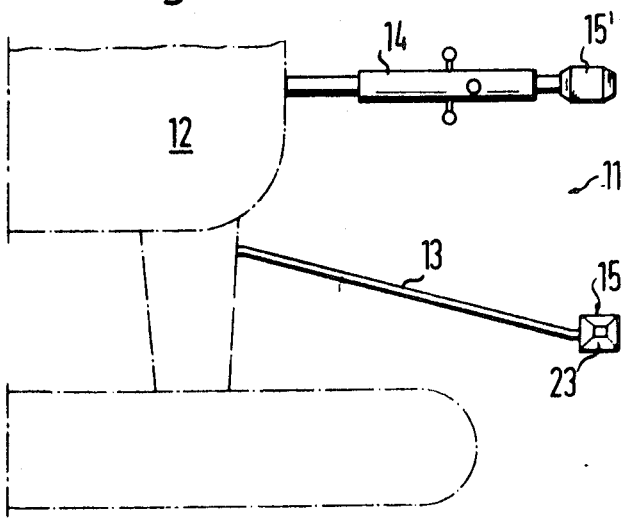
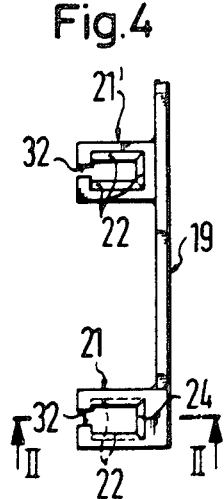
INVENTOR
Josef Gail
BY Kurt Kelman,
Hans Berman Patented March 27, 1973

INVENTOR
Josef Gail

BY Kurt Kelman,
Hans Berman,
AGENTS

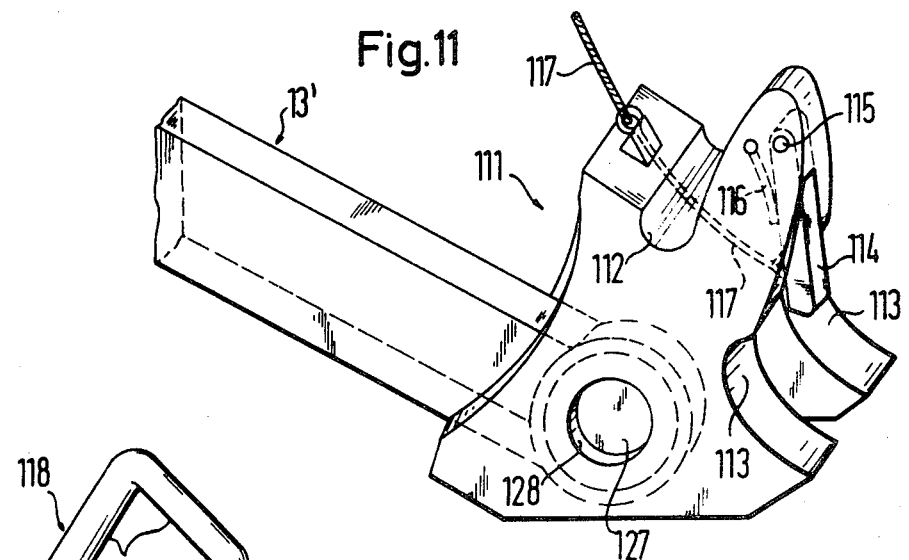
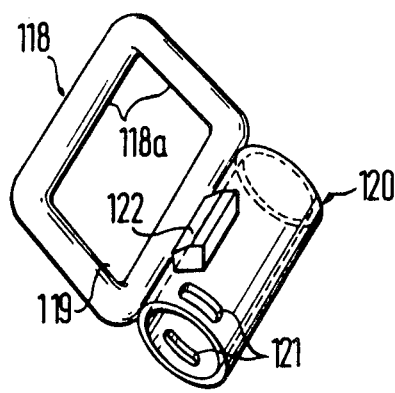
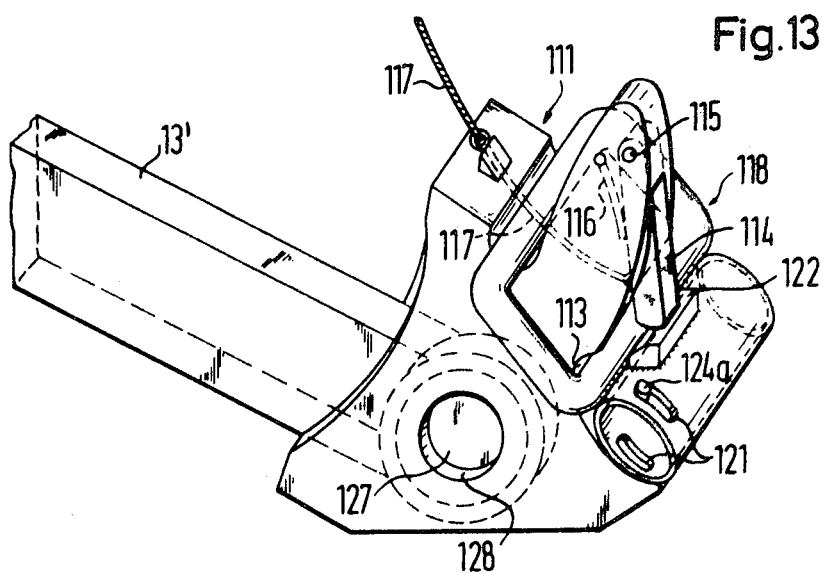

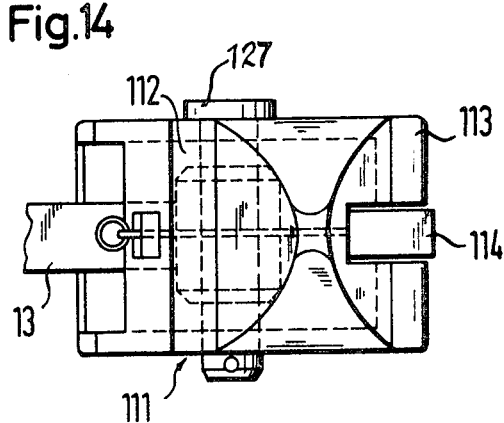
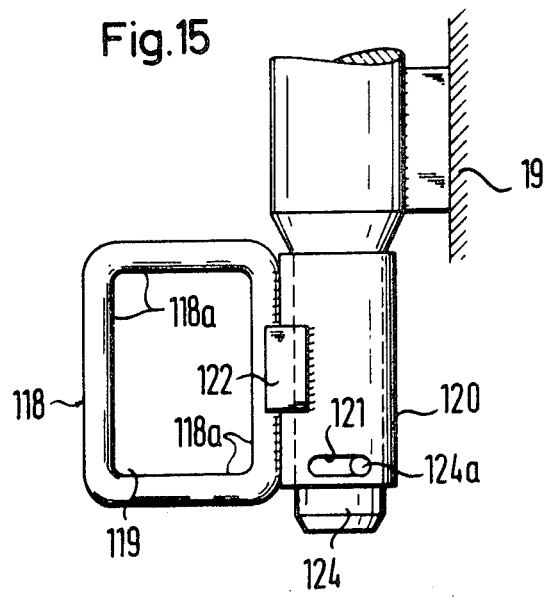
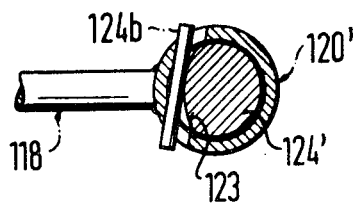

3,722,915

HITCH FOR COUPLING AGRICULTURAL IMPLEMENTS TO A TOWING VEHICLE

This invention relates to hitches or couplings for connecting a towing vehicle to a towed vehicle for joint movement in a predetermined direction, and more particularly to a three-link hitch for coupling an agricultural implement to a towing vehicle, such as a tractor.

It is known to equip the towing vehicle in such an arrangement with one upper and two lower links including respective coupling members cooperating with corresponding members on the towed implement which, for the purpose of this invention is also a vehicle even though it may not be equipped with wheels, runners, or the like. The cooperating elements are equipped with guides to facilitate engagement, and with latches which hold them in the engaged position. A three-link coupling is preferred and generally used in agricultural applications because it permits the weight of the implement to be partly transferred to the rear wheels of the tractor and provides positive steering of the implement when the tractor makes turns.

In known couplings, three bars carrying receptacles are attached to the tractor, and the receptacles are engaged by pins on the towed implement. While the known coupling arrangement has many desirable features, it cannot be engaged fully when soil enters the receptacles in the disengaged condition, and the latching mechanism is not activated by the only partly engaged coupling.

The primary object of this invention is the provision of a three-link coupling of the general type described whose operation is not unfavorably affected by contamination with soil which is unavoidable in agricultural work.

With this object and others in view, as will hereinafter become apparent, the invention provides at least one of the three links which is vertically and horizontally offset from the other two links respectively with a male coupling member and an eye member, the coupling member, when fastened to one of the towing and towed vehicles, extending vertically in the normal operating position of the two vehicles and having a free upper end. An opening extends vertically through the eye member in the operating position of the vehicle. Cooperating guides on the members guide upward movement of the coupling member into the opening of the eye member and abutments limit such upward movement in a terminal relative position of the members. A latch mechanism is provided for securing the members in their terminal position, and the latch may be released by manually operated means.

Other features, additional objects, and many of the attendant advantages of this invention will readily become apparent from the following detailed description of preferred embodiments when considered in connection with the appended drawing in which:

FIG. 1 shows a tractor and associated portions of a coupling of the invention in left side elevation, only a portion of the tractor being shown in phantom view;

FIG. 2 shows a portion of an agricultural implement and associated portions of a coupling of the invention in side elevational section on the line II — II in FIG. 4;

FIGS. 3 and 4 are respective fragmentary plan views of the devices of FIGS. 1 and 2;

FIG. 11 shows a coupling member and associated elements of another coupling of the invention in a perspective view;

FIG. 12 illustrates the eye member cooperating with the coupling member of FIG. 11 in a corresponding view;

FIG. 13 shows the devices of FIGS. 11 and 12 in the engaged position;

FIG. 14 is a top plan view of the device of FIG. 11;

FIG. 15 illustrates the eye member of FIG. 12 cooperating with an agricultural implement in top plan view; and FIG. 16 shows a modification of the device of FIG. 15 in fragmentary side-elevational section.

Figure 5:
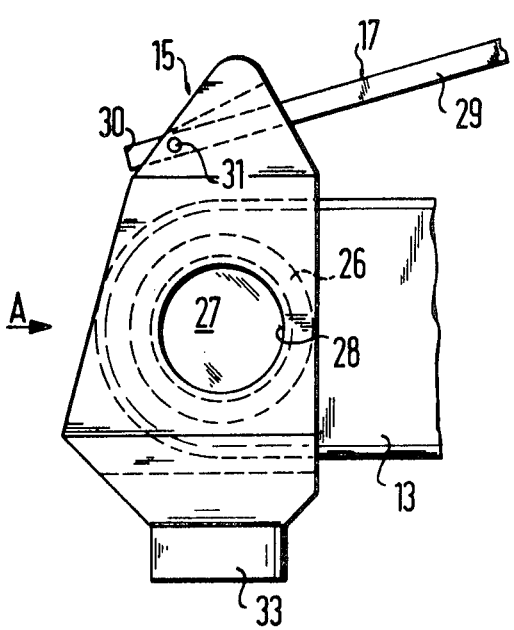
FIG. 5 shows a coupling member and associated elements of the apparatus of FIG. 1 in right side elevation on a larger scale.
Figure 6:
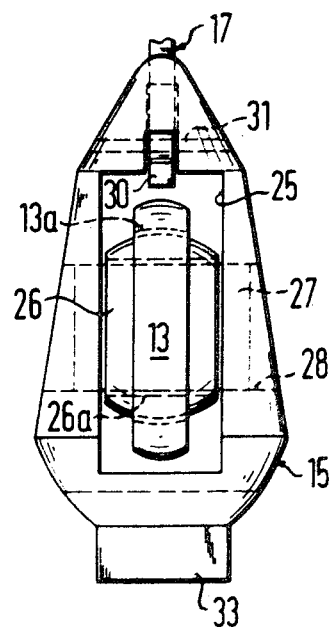
FIG. 6 illustrates the device of FIG. 5 in front elevation.
Figure 7:
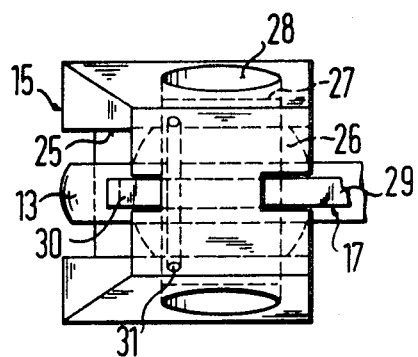
FIG. 7 is a fragmentary plan view of the device of FIG. 5.

Referring now to the drawing in detail, and initially to FIGS. 1 and 3, there is seen the front part of a three-link coupling 11 for connecting a tractor 12 to a towed implement, such as a plow, a disc harrow, a rake which travels in engagement with the soil and thus is a vehicle when towed by the tractor 12.

The coupling 11 includes two lower bars 13 arranged symmetrically relative to the vertical median plane of the tractor and an upper bar 14 located substantially in that plane. As is shown explicitly only for the bar 14, the bars may be mounted on the tractor body by pivots, may be capable of telescopic extension and contraction, and are conventional in themselves.

The ends of the bars 13, 14 remote from the tractor in a rearward direction relative to the normal direction of tractor movement carry male coupling heads 15, 15'. Ropes 16 connect latches 17, 17' on the coupling heads to the operator's seat 18 on the tractor. As is seen in FIGS. 2 and 4, the frame 19 of the implement to be towed by the tractor 12 carries three eye members 21, 21' welded to the frame 19 for simultaneous engagement by the coupling heads 15, 15'.

Each coupling head 15, 15' has four planar, outer faces 23 which converge upwardly in the two lower heads 15 and downwardly in the upper head 15' toward a free end of the coupling head. The four faces 23 are offset from each other at right angles so as to define the frustum of a four-sided, right pyramid. A weight 33 is integral with the lower end of each lower coupling head 15.

Figure 8:
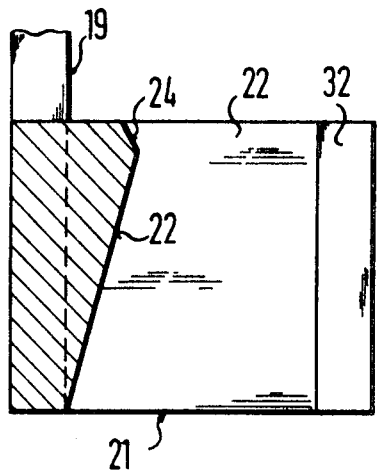
FIGS. 8 and 9 show an eye member of the apparatus of FIG. 1 on a larger scale in respective sections on the lines VIII — VIII and IX — IX in FIG. 10.
Figure 9:
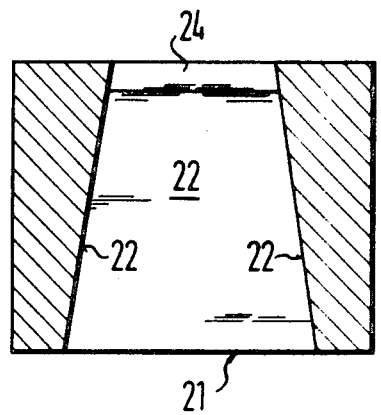
Figure 10:
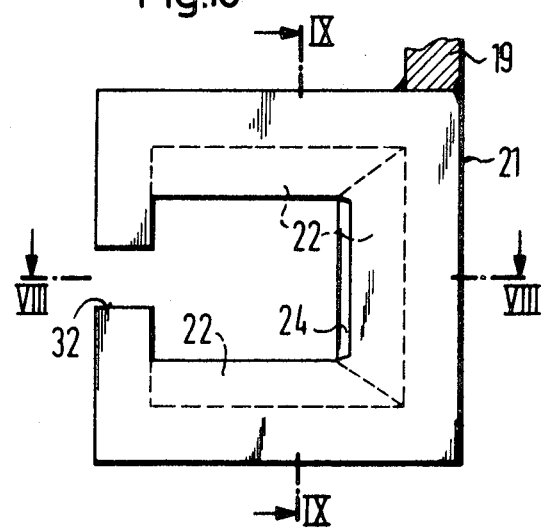
FIG. 10 is a top plan view of the device of FIGS. 8 and 9.

As is best seen in FIGS. 8 to 10, the opening extending through each of the eye members 21, 21' is bounded by inner faces 22 of which three converge toward each other and the fourth face so as also to define a frustum of a pyramid and are dimensioned and inclined for conforming engagement with outer faces 23 of the coupling heads 15, 15'. The rim about the narrow end of the opening through each eye member 21, 21' is provided with a bevel 24 on the side nearest the frame 19, and the opposite side of the eye member has a vertical slot 32.

One of the two lower coupling heads 15 and associated elements are shown in more detail in FIGS. 5 to 7. The head 15 and the weight 33 at its lower end are machined from a unitary, homogeneous piece of metal. A passage 25 of rectangular cross section extends horizontally through the coupling head 15, and one longitudinally terminal portion of the associated bar 13 is received in the passage. A circular transverse opening 13a in the terminal portion of the bar 13 has a spherically arcuate wall which forms the socket part of a universal joint of the ball-and-socket type. The ball part 26 is the central segment of a sphere and conformingly rotatable in the opening 13a about a center of rotation located above the center of gravity of the coupling head 15, the center of gravity being relatively low due to the weight 33. The center of rotation of the ball part 26 is located in a diametrical bore 26a of the latter in which a short shaft 27 is received. The two ends of the shaft engage normally horizontal openings 28 in the coupling head 15 so that the latter is capable of limited, universal, pivoting movement on the bar 13.

The upper end of the coupling head 15 extending beyond the frusto-pyramidal portion has the approximate shape of a cone with rounded apex. The latch 17 is a lever fulcrumed on a pin 31 in a passage formed in the conical upper end of the coupling head 15. The weight of the longer lever arm 29 normally holds the shorter arm 30 in the illustrated active position in which it projects beyond the plane defined by the adjacent outer face of the pyramidal head part. When the rope 16 attached to the end of the arm 29 omitted from FIG. 5 is pulled, the latch 17 is pivoted counterclockwise until the end of the arm 30 is retracted behind the afore-mentioned plane of the adjacent pyramid face. The pivotal movement of the latch 17 is limited by abutment against inner faces of the upper end of the coupling head 15.

The two lower coupling heads 15 are identical, and so are the two lower eye members 21. The upper coupling head 15' differs from each of the lower heads 15 by being inverted so that its outer faces taper in a downward direction, and it lacks a weight 33 so that its center of gravity is below the center of rotation of the ball-and-socket joint which attaches the head 15' to the bar 14 in a manner obvious from the description of the heads 15. The upper eye member 21' is identical with the eye members 21 except for its inverted position matching that of the corresponding coupling head 15'.

When the implement partly shown at 19 is to be coupled to the tractor 12, the latter is moved until the coupling heads 15 are located approximately below the eye members 21, and the bar 14 with its coupling head 15' is swung upward and out of the way. The bars 13 are then raised until the coupling heads 15 enter the large ends of the openings in the associated eye members 21. During further upward movement, the heads 15 are guided by engagement of corresponding faces 22, 23, and the movement is stopped by wedging abutment of the faces.

An inner face 22 of each eye member 21 abuttingly engages the projecting arm 30 on an upwardly moving coupling head 15 and holds the arm in its retracted position until it clears the rim about the upper, smaller orifice of the eye member. The arm 30 then is released to be pivoted by the weight of the longer arm 29 as soon as the coupling head 15 is firmly wedged in the cooperating eye member 21. The shorter arm 30 of the latch 17 engages the bevel 24 on the eye member and thereby secures the coupling head 15 against movement out of the eye member and also against angular displacement about an axis transverse to the normal direction of movement of the tractor 12. The slot 32 in the eye member 21 passes the latch 17 and accomodates the bar 23 in the terminal relative position of the coupling head 15 and the eye member 21 described above, but not explicitly shown in the drawing.

The upper bar 14 may then be swung clockwise, as viewed in FIG. 1, to engage the coupling head 15' with the eye member 21' in a manner closely analogous to the engagement of the heads 15 with the eye members 21, the engaged head 15' being secured by the latch 17'. When the latches 17, 17' are swung by the ropes 16 to retract their short arms 30, the heads 15,15' may be withdrawn from the eye members 21, 21' to uncouple the implement 19 from the tractor 12.

FIGS. 11 to 15 illustrate a modified, male coupling head 111 and a modified eye member 118 which may be used for converting a known three-link coupling to a coupling of the invention.

The coupling head 111 has four outer faces which converge in the approximate shape of a pyramid toward an upper end of the head 111 in the operative position of the associated vehicles, not themselves seen in FIGS. 11 to 15. Two grooves 112, 113 at the base of the pyramid are of concave shape about horizontal axes of curvature perpendicular to the direction of elongation of the linkage bar 13', analogous to the aforedescribed bar 13, on which the head 111 is fastened.

The bar 13' is partly received in an upright slot of the coupling head 111 in which one end of a latching bar 114 is suspended from a pivot pin 115. A leaf spring 116 in the slot biases the latching bar 114 toward the active position seen in FIGS. 11 and 13 in which the other, lower end of the bar projects from the coupling head 111. The bar 114 may be retracted within the general outline of the head 111 by a rope or string 117 attached to the bar 114 and passing through the slot of the head 111 and a bore communicating with the slot to the seat 18 of the tractor operator as is shown for the ropes 16 in FIG. 1.

The end of the bar 13' received in the coupling head 111 carries an integral eye 128 pivotally secured in the coupling head 111 by a pin 127 as is best seen in FIG. 14. The pin is shown in FIGS. 11 and 13 in the partly retracted position for the sake of clearer pictorial representation.

The pyramidal part of the coupling head 111 is shaped and dimensioned for engagement with an eye member 118 of heavy round wire bent into the shape of a rectangle and welded into a closed loop about a central opening 119. The four inner faces 118a of the eye member 118 engage the outer faces of the pyramidal coupling head portion and guide the coupling head 111 into the terminal position shown in FIG. 13 in which further movement of the head 111 inward of the eye member 118 is prevented by abutment of the eye member 118 against the walls of the grooves 112, 113. The latching bar 114 is shifted into the retracted position during movement of the head 111 into the opening 119, and clears the eye member 118 only in the position of FIG. 13.

As is best seen in FIG. 12, one long side of the eye member 118 is welded to a cylindrical sleeve 120 having two diametrically opposite, circumferentially elongated slots 121. An abutment pad 122 is welded to the sleeve 120 closely adjacent the eye member 118 which is located in a plane including the axis of the sleeve 120. The height of the pad 122 is selected so that it engages the latching bar 114 in the terminal relative position of the head 111 and of the eye member 118 and thereby firmly secures the engaged elements to prevent any relative movement of the same.

As is shown in FIG. 15, the sleeve 120 receives therein a portion of a pin or shaft 124 practically identical in its dimensions with the afore-mentioned pin 127 and welded to the frame 19 of an agricultural implement not otherwise shown and not directly relevant to this invention. A pin 124a passes through the shaft 124 along a diameter of the same, and its two ends respectively project into the slots 121 of the sleeve 120, thereby axially securing the sleeve 120 on the shaft 124 and limiting its angular displacement.

Limited rotatability of a sleeve 120' on a shaft 124' in an arrangement otherwise identical with that illustrated in FIG. 15 is achieved in the modified device of FIG. 16 by means of a crescent-shaped groove 123 cut into the circumference of the shaft 124' and receiving a pin 124b fixedly fastened to the sleeve 120'. The groove 123 is formed conveniently by drilling the necessary bores in the sleeve 120' while the shaft 124' is received in the same, and by turning the shaft slightly while the drill bit is guided in the two freshly formed bores so that the flutes of the drill bit machine the groove 123 in the shaft 124'.

The mode of operation of the apparatus illustrated in FIGS. 11 to 15 or 16 is so closely similar to that of the coupling described with reference to FIGS. 1 to 10 as not to require separate description.

The shaft 124 and the eye 128 are elements of a conventional three-link coupling for connecting a towing vehicle, such as a tractor, to a towed vehicle, such as an agricultural implement, and were originally connected by the shaft 124 being received directly in the eye 128 of the bar 13'. FIGS. 11 to 16 illustrate the manner of converting such a conventional coupling to a coupling of the invention by means of a suitably shaped coupling head 111 and a sleeve-bearing eye member 118. It will be appreciated that the coupling member and eye member of the invention may be dimensioned for connecting not only vehicles equipped for direct connection with each other, but also a towing vehicle equipped with eyes on linking bars not dimensioned for cooperation with a shaft on an implement. The coupling heads and eye members of the invention are quickly interchanged with analogous, differently dimensioned elements so as to permit one tractor to be used with a multitude of implements not designed to fit the linkages provided on the tractor.

While the invention has been described with particular reference to specific embodiments, it is to be understood that it is not limited thereto, but is to be construed broadly and restricted solely by the scope of the appended claims.

What is claimed is:

1. In a coupling for connecting a towing vehicle to a towed vehicle for joint movement in a predetermined direction, the coupling including three links, one of said links being offset vertically and horizontally from the other two links respectively in the normal operating position of said vehicles, the improvement in said one link which comprises:
   a. a male coupling member and an eye member;
   b. fastening means for respectively fastening said members to said vehicles,
      1. said coupling member, when fastened to one of said vehicles, extending vertically in said operating position and having a free upper end,
      2. said eye member being formed with an opening extending vertically therethrough in said operating position;
   c. cooperating guide means on said members for guiding upward movement of said coupling member into said opening;
   d. cooperating abutment means on said members for limiting said upward movement in a terminal relative position of said members;
   e. latch means for securing said members in said terminal position; and
   f. releasing means for releasing said latch means.

2. In a coupling as set forth in claim 1, said coupling member having upwardly converging outer faces and said eye member having inner faces in said opening, said faces jointly constituting said guide means and said abutment means.

3. In a coupling as set forth in claim 2, said outer faces conformingly engaging said inner faces in said terminal position.

4. In a coupling as set forth in claim 3, said faces of each of said members being angularly offset relative to each other and bounding the frustum of a pyramid.

5. In a coupling as set forth in claim 1, said fastening means including a linking bar, mounting means for mounting said bar on said one vehicle, and universal joint means fastening said coupling member to said bar.

6. In a coupling as set forth in claim 5, said eye member being formed with a slot receiving said bar in said terminal position of said members.

7. In a coupling as set forth in claim 5, said universal joint means having a ball part and a socket part movable relative to each other about a center of rotation, said coupling member having a center of gravity downwardly offset from said center of rotation in said operative position.

8. In a coupling as set forth in claim 7, a terminal portion of said linking bar being formed with said socket part, said ball part being received in said socket part of said terminal portion, said coupling member being formed with a recess receiving said terminal portion and said ball part, and a pin received in said coupling member passing through a bore of said ball part, said center of rotation being located in said bore.

9. In a coupling as set forth in claim 1, said latch means including a latch member pivotally mounted on said coupling member adjacent said upper end of the same for movement between an active position in which said latch member projects from said coupling member for abutting engagement with a face of said eye member directed upwardly in said operative position of said vehicles, and a retracted position, said eye member including abutment means in said opening thereof for moving said latch member from the active position to the retracted position in response to said upward movement of the coupling member, and biasing means biasing said latch member toward said active position.

10. In a coupling as set forth in claim 1, said latch means including means for preventing relative angular displacement of said members about an axis transverse to the normal direction of movement of said vehicles in said terminal position.

11. In a coupling as set forth in claim 1, said fastening means including a sleeve member fixedly fastened to said eye member, a shaft member rotatably received in said sleeve member, and attaching means for attaching said shaft member to the other one of said vehicles.

12. In a coupling as set forth in claim 11, means for axially securing said sleeve member on said shaft member and for limiting relative angular displacement of said sleeve member and of said shaft member.

* * * * *